Patented Dec. 15, 1925.

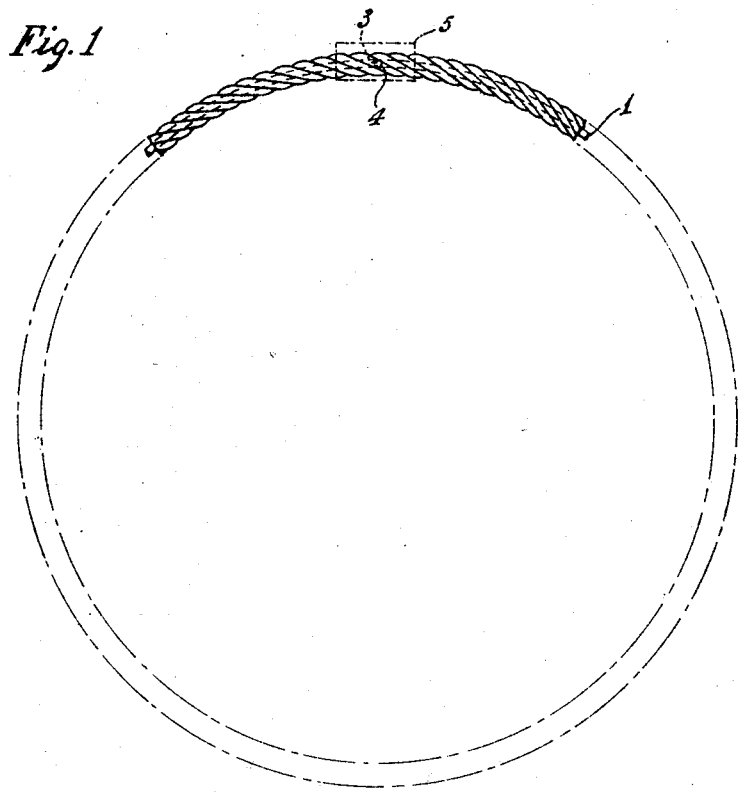
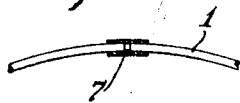
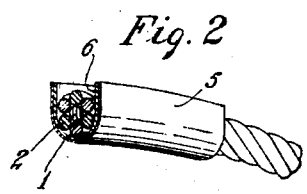
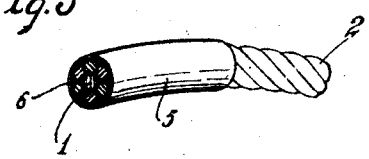

1,565,617

UNITED STATES PATENT OFFICE.

FRANK H. BEYEA, OF AKRON, OHIO, ASSIGNOR TO JOHN R. GAMMETER, OF AKRON, OHIO.

CABLE BEAD FOR TIRES.

Application filed September 8, 1921. Serial No. 499,304.

*To all whom it may concern:*

Be it known that I, FRANK H. BEYEA, a citizen of the United States, residing at Akron, in the county of Summit, State of Ohio, have invented certain new and useful Improvements in Cable Beads for Tires, of which the following is a specification.

The invention relates to the construction of endless wire cables for use in the manufacture of tire casings or for similar purposes, it being designed to improve upon existing types of bead structures. The objects of my invention are to provide a new and improved fastening device for the bead, which is composed of a core wire and outer spirally wound covering wire, so as to securely hold the ends of the covering wire and in some aspects of the invention to hold the ends of the core wire together.

The invention is illustrated and described in exactness and detail in this application, but it will be understood that variations and modifications may be made without departing from the invention or sacrificing any of its benefits.

In the drawings, Fig. 1 is a view of the bead, the attaching clip being shown in dotted lines;

Fig. 2 is a fragmentary view showing the attaching clip as being applied;

Fig. 3 is a similar view showing the clip in place and the joint completed; and

Fig. 4 is a view showing one method of uniting the ends of the core wire.

The bead wire comprises a central core wire 1 and a covering wire 2, which is wound spirally thereabout in a plurality of convolutions which are formed from a single wire and cover the entire surface of the core wire. The ends of the core wire meet at 3, and the ends of the covering wire meet at 4.

In one aspect of my invention the core wire 1 is made of a low carbon steel which is relatively soft so that it will weld easily, while the outer covering wire is made of hard drawn wire which gives the requisite tensile strength and toughness to the bead.

While the core wire may be welded together, as a modification of the invention as shown in Fig. 4, the ends may simply be abutted in which case a sleeve 7 may be used, which, if desired, may be made of fusible metal. It is advisable in this case, that after the winding operation is completed, the ends of the core wire be soldered and it is also advisable to connect the abutting ends 4 of the covering wire together. By superimposing or registering joints 3 and 4, I may connect both the ends of the core wire and the covering wire together at a single operation which will melt the fusible sleeve 7 and also connect the covering wire and the core wire preventing shifting of one or the other. The fusible sleeve 7 will flow into the coils of the wire and the hump caused thereby will be eliminated. It is also not necessary that the ends of the covering wire abut as they may overlap slightly if found desirable.

As a convenient means for connecting the joints in the wire or wires, I may use a clip or sleeve 5, the inner surface of which is coated with a fluxing or soldering alloy or compound 6. The clip is placed in position as shown in Fig. 2 and then bent around to surround the bead at the joints 3 and 4. Heat is then applied which causes the soldering compound to flow into the wires of the bead and unite the ends together, both of the covering wire and the core wire, if the latter is not previously welded. The operation also secures the two wires together to prevent shifting.

The sleeve or clip may be used to carry the dimensions of the bead wire and other data as may be advisable.

Claims:

1. A circular tire bead comprising a core wire the ends of which abut, and a covering of spirally wound wire the ends of which are in contact, the said joints being alined, and a coating of solder over the joints in both said wires and serving to unite the wires and prevent relative movement of the two said wires.

2. A circular tire bead comprising a core wire and a covering of spirally wound wire, the ends of which latter wire are in contact, a sheet-metal sleeve over the ends of the covering wire, and a coating of solder adhering to the sleeve and surrounding the ends of the covering wire and the core wire.

3. A circular tire bead comprising a core wire the ends of which abut, and a covering of spirally wound wire the ends of which also abut, the joints in the core wire and the covering wire being in line, and a sheet-metal sleeve surrounding the joints.

4. A circular tire bead, comprising a core wire the ends of which abut, and a covering of spirally wound wire, the ends of which also abut, the joints in the core wire and the covering wire being in line, and a sheet-metal sleeve surrounding the joints, and a coating of solder adhering to the sleeve and surrounding the joints of the covering wire and the core wire.

5. A circular tire bead comprising a core wire of soft steel and a covering wire of hard steel, the ends of the covering wire being held together by solder which also unites the covering wire to the core wire and prevents a shifting of the two wires.

FRANK H. BEYEA.